Patented Dec. 5, 1944

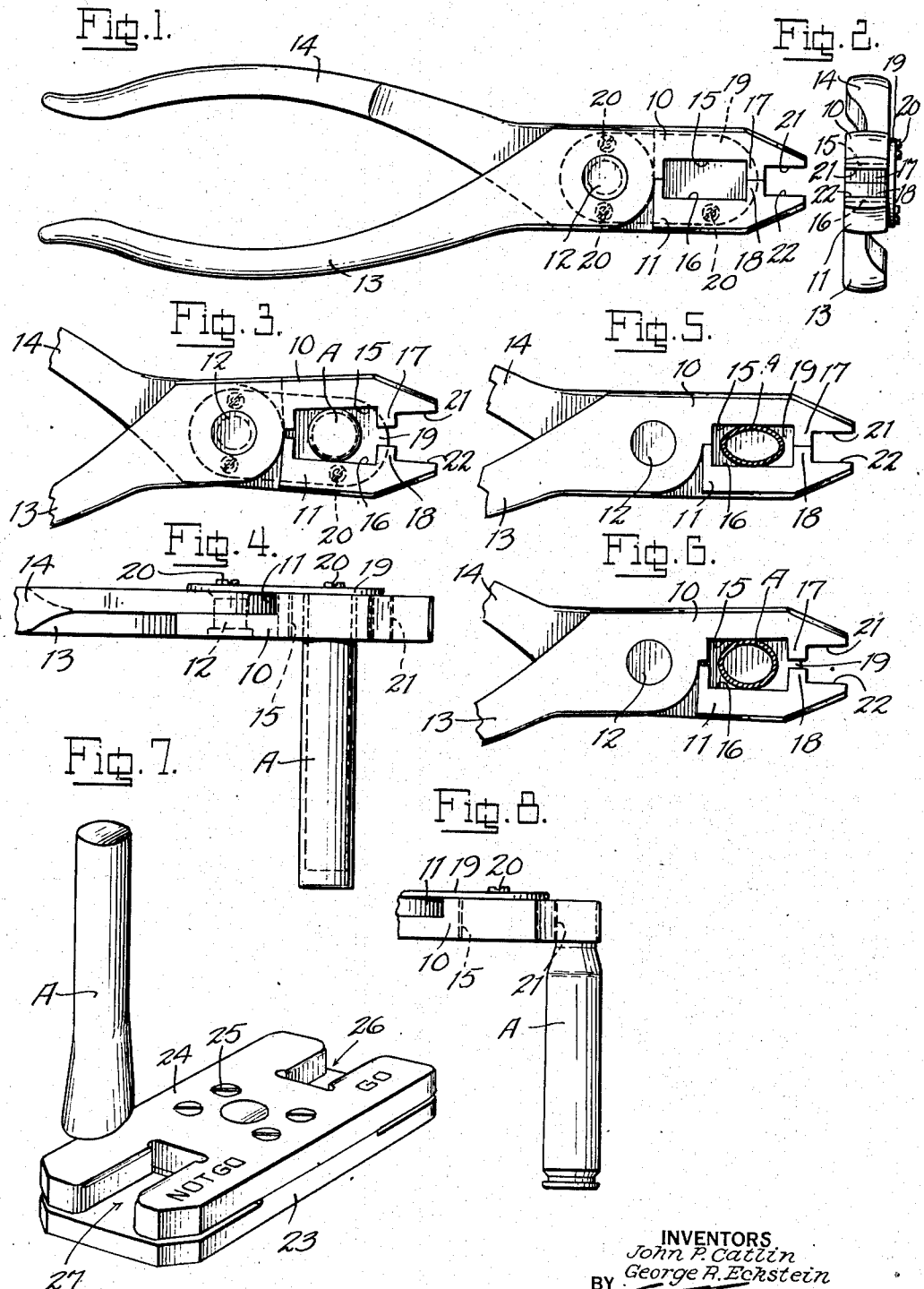

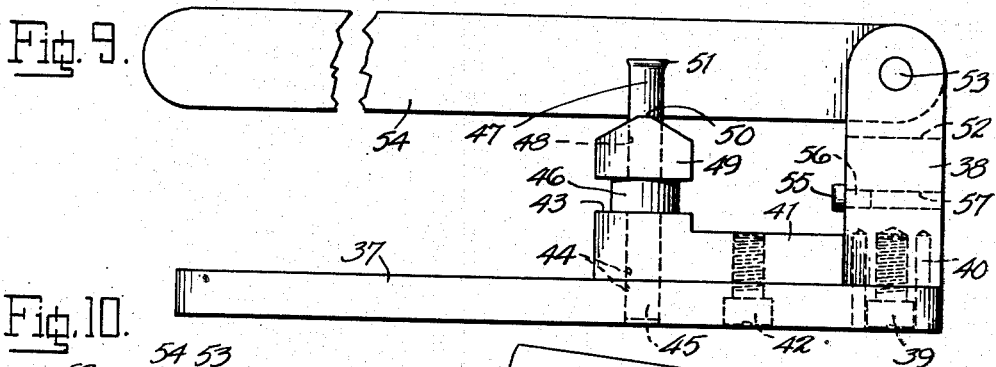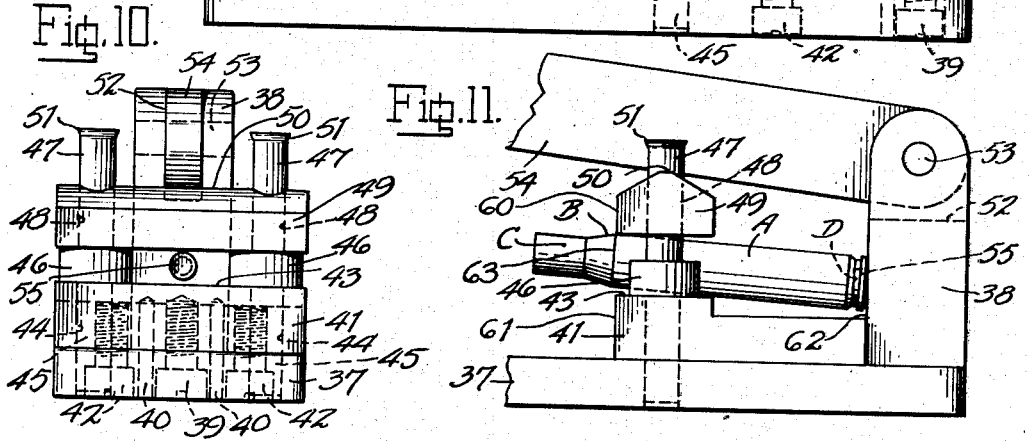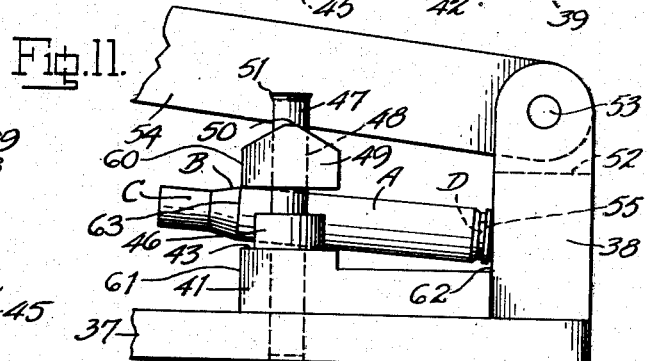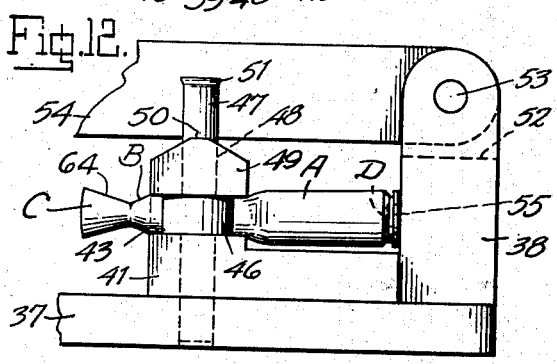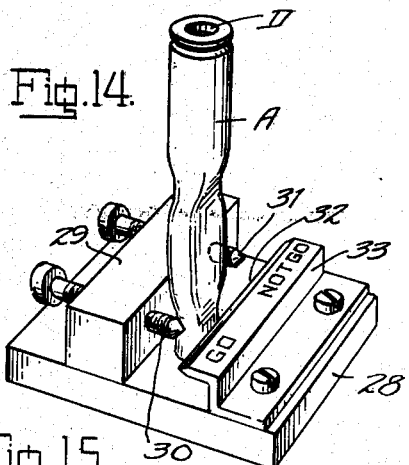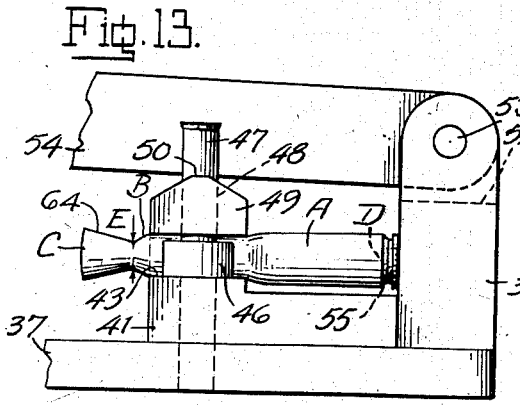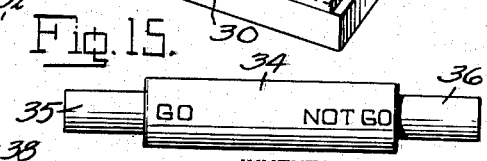

2,364,129

UNITED STATES PATENT OFFICE 2,364,129

TESTING ANNEAL OF CARTRIDGE SHELLS AND THE LIKE

John P. Catlin and George R. Eckstein, Bridgeport, Conn., assignors to Remington Arms Company, Inc., Bridgeport, Conn., a corporation of Delaware Application November 20, 1942, Serial No. 466,262

7 Claims. (Cl. 73—88)

The present invention relates to a method and apparatus for testing metal objects, and more particularly tubular objects, such as, for instance, cartridge shells, the testing being concerned with such characteristics as hardness, grain size, elastic strength and recovery following internal pressure, and detection of internal stresses and location of color lines in connection with localized annealing operations. It is proposed, according to the invention, to test such characteristics by determination of elastic deformation and recovery directly, upon the basis that elastic recovery of metal varies in accordance with any variation in the characteristics under test. It is proposed to determine the deformation and recovery dimensions from a cartridge shell or similar object of known characteristics by squeezing it at a given point or area to an arbitrarily determined dimension, and gauging the elastic recovery after squeezing at a given point or area, the squeezing and recovery dimensions thereupon being the standards for production testing cartridge shells or similar objects by squeezing and gauging. Where the object undergoes a succession of annealing and forming operations the standards and squeezing and gauging points or areas are determined for each production step requiring test.

In connection with cartridge shells, the properties of the metal, such as hardness, elastic strength and recovery, and grain size, and which vary in different portions of the case, are of paramount importance in the use of the cartridge. The shell of a cartridge is, in firing, subjected to an enormous internal pressure and must expand outwardly without rupture until it is supported by the chamber wall. As internal pressure returns to normal the shell must contract to such an extent that it does not grip the chamber wall and can be extracted. Thus, the metal of the shell must be sufficiently soft to permit the necessary expansion without failure and yet sufficiently hard and elastic to contract enough for extraction. The usual metal specification has been based on grain size; in general, the finer the grain the harder, more elastic and more brittle the metal. Grain size is usually determined by microscopic examination of a polished and etched surface of the metal—a slow laboratory operation. A standard set of grain sizes has been established as described by A. S. T. M. Specification No. E2–39T. The grain size of the sample under test is determined in accordance with said A. S. T. M. specification or is compared visually with the A. S. T. M. plates. This is an operation which is slow, is conducted in a laboratory, and requires some degree of experience. Another difficulty is that the grain size standards are not sufficiently close together in some needed ranges to give all the desired results. Hardness, such as determined by the Rockwell, Brinell or Scleroscope, is another measure of the desired property of the metal but requires laboratory apparatus and an expertly controlled procedure for its determination but such a means is not exactly correlated with the desired properties in ammunition components. In the manufacture of cartridge shell, from the first draw of the cylindrical piece to the finished shell, having a tapered body wall of varying thickness between its ends and a contracted neck and bullet receiving mouth at its open end, the shell must be subjected to a number of forming operations and a succession of anneals directed at localized areas, depending upon the particular operation following each anneal. As the case is drawn it becomes work hardened and must be annealed. Consequently, the degree and extent of the anneals must be precisely controlled throughout production so that an operation upon one part of the shell will not deleteriously affect other parts. The tests heretofore carried out in connection with these annealing operations by determining grain sizes was slow and tedious, and during the relatively long period, required to perform the test, the production of the anneal units would be stopped. If the grain size were correct at the first test, work proceeded. If incorrect, a new machine set-up was tried and the testing procedure repeated. Very frequently gas would fluctuate or of necessity, be turned off and a new determination in grain found.

In carrying out the method of the present invention it was determined that, basically, annealing destroys the elastic recovery of metal. In other words, a bending moment applied to an unannealed metal structure does not leave the degree of permanent set that the same bending moment would leave if applied to an annealed metal structure. Consequently, any variation in the anneal which affects grain size and other characteristics will result in a variation in the elastic recovery, the dimension upon elastic recovery being inversely proportional to the degree of anneal, and given a standard recovery dimension for a known grain size any variation in the anneal will result in a recovery dimension at variance with the standard.

One previous method of testing cartridge shells or the like for determination of the degree of anneal, as for instance, evaluating the mouth and neck anneals in the case of cartridge shells, is the so called "mercury cracking test," designed to detect internal stresses and hardness, and involves subjecting the case, or a portion thereof, to a mercurous nitrate solution after the case has been cleaned properly, such as by the use of nitric acid. The results of such tests are used as a guide in making necessary adjustments in the annealing temperature and in location of the annealing flames. The mercury cracking test serves to indicate, for one thing, a degree of anneal which may leave a strained structure producing the defect known as "season cracking." The mercury accelerates failure of an incorrectly annealed case by attacking the bond between grains.

According to the invention it is proposed to evaluate such anneals by elastic deformation testing, wherein it has been determined that a recovery dimension can be established at a predetermined point or area following an established squeeze at a predetermined point or area whereby both mercury cracking testing and grain size determination is avoided.

In the determination of color line or the "zone" of anneal, it is necessary to cut open the cartridge case. The color line is difficult to determine due to dirt and other extraneous substances which might be present on the surface of the case. The point which is determined to be the color line may also vary with the observer as is often the case with visual inspecting means. It is thus a further object of the invention to evaluate the zone of anneal and locate the same positively.

With the above and other objects in view, embodiments of the apparatus for carrying out the invention are shown in the accompanying drawings, and these embodiments will be hereinafter more fully described with reference thereto, and the invention will be finally pointed out in the claims.

In the drawings:

Fig. 1 is a side elevation showing pliers according to the invention, for carrying out the squeezing operation upon the cartridge shell or other metal object to be tested.

Fig. 2 is a front end view of the pliers.

Fig. 3 is a side elevation, showing the pliers in open position, with the open end of a cartridge shell engaged therein preparatory to being squeezed.

Fig. 4 is a plan view of the pliers in open position, with the shell engaged therein as shown in Fig. 3.

Fig. 5 is a side elevation of the pliers in squeezing position, the squeezed open end of the squeezed cartridge shell being shown in transverse section.

Fig. 6 is a side elevation of the pliers upon release after squeezing, the open end of the cartridge shell being shown in transverse section after elastic recovery from the squeezing operation, as shown in Fig. 5.

Fig. 7 is a perspective view, showing a gauge device for gauging the deformed cartridge shell, the latter being shown in position to be engaged therewith.

Fig. 8 is a plan view of the jaw end of the pliers, showing the same engaged with the neck portion of a cartridge shell.

Fig. 9 is a side elevation of a modified form of squeezing device for carrying out the invention.

Fig. 10 is a front elevation thereof.

Fig. 11 is a side elevation showing the cartridge shell placed therein preparatory to being squeezed.

Fig. 12 is a side elevation, showing the device in squeezed position and the squeezed cartridge shell therein.

Fig. 13 is a side elevation showing the device upon release following the squeezing operation shown in Fig. 12 and showing the cartridge shell after elastic recovery from the squeezing operation.

Fig. 14 is a perspective view of a modified form of gauge device, particularly for gauging the squeezed shell as illustrated in Figs. 9 and 13, the shell being shown in position to be gauged.

Fig. 15 is a side elevation of a test plug gauge for setting the gauge device as shown in Fig. 14.

Similar reference characters indicate corresponding parts throughout the several figures of the drawings.

Referring to the drawings, particularly to Figs. 1 to 8 thereof, the device, according to the exemplary embodiment of the invention illustrated therein for carrying out the testing method of the invention, comprises a plier tool consisting of cooperating opposed jaw members 10 and 11, pivotally connected by means of a pivot pin 12, and respectively provided with handle extensions 13 and 14. The jaw members 10 and 11 are provided with complementary right angular cut-outs 15 and 16, constituting in the closed position of the pliers, determined by meeting engagement of the abutment stop portions 17 and 18, a rectangular article receiving opening having opposed parallel faces. These opposed faces are precisely ground so that the dimension between them corresponds to the predetermined squeeze dimension to be given to the article to be tested. A plate member 19 is secured by screws 20 to one side of the jaw member 11 and overlies one side of the jaw member 10 to provide a closure wall for the article receiving opening, and which predetermines the extent of engagement of the article within the plier, the end of the article being held firmly against the closure wall during the squeezing operation.

The plier opening 15—16 is especially adapted to receive the open end of an article to be tested in position to have this open end squeezed, and for the purpose of adapting the pliers to the squeezing of the article at a predetermined point intermediate its ends, as for instance the body of a cartridge shell adjacent the neck, the end of the pliers, beyond the closure plate 19 and the abutment stop portions 17 and 18, is provided with right angular cut-outs 21 and 22 in the ends of the respective jaw members 10 and 11, these cut-outs in the closed position of the plier constituting an open ended recess having parallel opposed faces for receiving the article to be squeezed, these opposed faces being precisely ground to the predetermined dimension between the faces to which the article is to be squeezed.

As shown in Figs. 3 to 7, the article under test is illustrated as a tubular cylindrical cartridge shell A in one of the early stages of manufacture, i. e. before formation of the contracted bullet receiving mouth. The shell is tested by elastic deformation to determine its elastic recovery by engaging the cylindrical open end in the opening 15—16 of the pliers as shown in Figs. 3 and 4. In this case it can be assumed, for the sake of illustration, that an annealing operation or a forming operation, upon the shell following an anneal, has been laboratory analyzed in connection with a shell known to be perfect through grain size or other suitable tests; and that from this perfect shell a squeezzing dimension standard has been established and the elastic recovery following the squeezing operation has been precisely measured to establish a gauging recovery dimension standard. Thus, for example, the squeezing dimension may be established as .338 inch and the elastic recovery dimension as .380 inch for a cal. .30 case before necking or tapering. The dimensions of course will vary in accordance with the operation, shell, material, etc. For production testing this operation the dimension of the squeezing opening 15—16 is precisely ground to .338 inch, and a suitable gauge is provided having "Go" and "Not Go" gauging openings precisely ground to dimensions respectively slightly greater and slightly less than .380 inch. Such a gauge is illustrated in Fig. 7 and comprises a base plate 23 having a gauge plate 24 secured thereto by screws 25 and provided at its respective ends with designated "Go" and "Not Go" openings 26 and 27.

As shown in Fig. 5 the cartridge shell is subjected to the squeezing operation by compressing the pliers to the closed position determined by the abutment stop portions 17 and 18, and upon release of pressure on the pliers the cartridge shell expands through elastic recovery to the deformation shape shown in Fig. 6, the plier jaws being freely movable so that they oppose no restraint to expansion of the shell. According to the present testing method this elastic recovery will vary if there is any variation from the desired standard in the anneal or other operation being production tested, the elastic recovery being inversely proportional to the degree of anneal. The shell must recover to the established standard dimension; if it fails to do so it is too soft, if it recovers too much it is too hard (and may split under firing pressure). The squeezed shell is gauged by entering its squeezed end into the "Go" and "Not Go" openings of the gauge. If it is the proper dimension, it will enter the "Go" opening, but will not enter the "Not Go" opening. If it has an excessive dimension, indicating insufficient anneal or hardness, it will not enter the "Go" opening; while if its dimension is less than the established standard, indicating excessive anneal or softness, it will enter both the "Go" and "Not Go" openings. The speed and facility with which this testing method may be carried out by relatively inexpert machine operators enables frequent periodical testing during production, expeditious correction of the annealing flames, and minimum loss in production time and output.

In Fig. 8, the neck of the cartridge case A is being tested by use of the jaw openings 21 and 22 so as to determine the degree of anneal at this portion of the shell. It has been previous practice to use the "mercury cracking" test to determine the degree of anneal at this point.

It is to be understood that other points of the case or article may be tested in a similar manner after properly correlating the results.

In Figs. 9 to 13, there is illustrated a modified form of apparatus, according to the invention, for practicing the method of the invention, comprising a bench type press consisting of a base plate 37, provided at one end with a vertical standard 38 secured thereto by a screw 39 and dowels 40, and provided forwardly of the standard with an anvil block member 41 secured by a screw 42, this block member being provided in forwardly spaced relation to the standard with a raised flat anvil face 43. At each side of the intermediate portion of the anvil face 43 there is provided a vertical cylindrical hole 44 extending through the anvil and the base, in which there is secured by a press fit the downwardly extending vertical shaft portion 45 provided at the underside of a cylindrical stop block member 46 engaged with the anvil face, this stop block being provided at its upper side with an upwardly extending vertical guide post portion 47. These guide post portions are engaged with vertical passages 48—48 provided at the ends of a presser bar 49 having its lower face parallel to and opposed to the anvil face 43, the upper side of the bar being chamfered to provide a central bearing rib portion 50. The upper ends of the guide post portions 47 are upset, as at 51, to retain the presser bar against removal.

The upper end of the standard 38 is provided with a slot 52, and has pivotally supported therein by means of a pivot pin 53 the end of a pressure applying lever 54 projecting forwardly and engaged with the bearing rib portion 50 of the presser bar 49.

Upon the forward face of the standard there is provided a cartridge shell positioning pin 55, having its shank portion 56 engaged with a press fit in a hole 57 extending through the standard, this pin being disposed in substantially centrally aligned relation with the shell receiving space between the anvil block and the presser bar, and adapted to position the cartridge shell by engaging the primer cap pocket D in the head.

It will be understood that by obvious modification the press of Figs. 9 to 13 can readily be adapted for squeezing the mouth end of a cartridge shell or similar article, or, in fact, any predetermined point or area thereof to be tested according to the invention. The height of the stop blocks 46 corresponds to the established standard squeeze dimension, and, therefore limits the squeeze imparted to the article engaged upon the anvil to this dimension.

As shown in Fig. 11, the cartridge shell is engaged beneath the presser bar and positioned by the pocket engaging pin 55 preparatory to being squeezed by downward pressure applied to the bar by means of the lever. Fig. 12 illustrates the cartridge shell in its squeezed condition; and Fig. 13 illustrates the elastic recovery of the cartridge shell after squeezing, the presser bar being free to move upwardly upon the guide post portions 47 without imposing restraint upon the elastic recovery of the shell. The squeezed shell is gauged to measure the elastic recovery dimension by means of the "Go" and "Not Go" gauge, as illustrated in Fig. 14.

The edges 60 and 61 of the presser member should be so arranged relative to the face 62 of the upright 38 as to bring the shoulder 63 of the case in line therewith. It has been found that when so located the best results are obtained. As the shell is squeezed the neck portion takes the shape shown in Figs. 12 and 13 at 64. If the neck portion B (Fig. 11) of the shell is too hard, the dimension E of Fig. 13 will be too large. If the neck is too soft, dimension E will be too small. Cartridge case mouths must be annealed to receive and hold the projectile properly. Adjacent the shoulder 63 (Fig. 11), the case must be sufficiently hard so that when the primer is struck there will not be a cushioning effect such as would be caused by too soft a shoulder. For this reason, the zone of anneal at the tapered portion B must be accurately located and not include the shoulder. It has been the previous practice to require the color line to be about ⅔ the distance down on the tapered portion B. The exact reason for this variation is not known. The limits of dimension E at a definite point relative to the mouth will serve therefore, to give a measure of both the zone and degree of anneal which can be compared to a satisfactory case. In this manner the difficult and uncertain color line determination is eliminated as is also the mercury cracking test.

The "Go" and "Not Go" gauge for gauging the squeezed shell may be of any suitable type, but preferably is designed to measure a point of the shell at a predetermined distance from the open end. In Fig. 14, a suitable gauge of this type is illustrated, and comprises a base plate 28 mounting a block member 29, in which a pair of spaced parallel horizontally disposed "Go" and "Not Go" screws 30 and 31 are engaged, the ends of these screws being preferably pointed and disposed in directly opposed relation to the V-edge 32 of a bar 33 secured upon the base plate, the opposed screw points and the V-edge being at a predetermined height from the base plate corresponding to the distance from the end of the shell of the established point to be measured. The screws are respectively set at spacings from the V-edge 32, slightly greater and less than the established standard recovery dimension, and these settings can be conveniently made with a suitable plug gauge 34 having "Go" and "Not Go" plug ends 35 and 36 having diameters corresponding to the "Go" and "Not Go" dimensions. The squeezed shell is held perpendicularly with its open end in engagement with the base 28 and is entered between the screw points and the V-edge of the bar 33. If it is of the proper elastic recovery dimension at this point from the mouth it will pass the "Go" screw but will not pass the "Not Go" screw. If the dimension is too great it will not pass either of the screws, and if too small it will pass both of them. By this means, both the zone and degree of anneal is determined. The location of the point of measurement could be determined from the base.

The form of the invention illustrated in the drawing and described herein is typical and illustrative only, and it is evident that the invention is capable of embodiments in other forms, all falling within the scope of the appended claims, which are to be broadly construed.

What is claimed is:

1. The method of testing the anneal of the metal of a deformable cartridge shell or like article which comprises deforming the article by pressure to a deformation dimension pre-established from an article of acceptable anneal, releasing the deformation pressure to permit elastic recovery and gauging the elastic recovery dimension in comparison with an elastic recovery dimension pre-established from said article of acceptable anneal.

2. The method of evaluating anneal boundaries of the metal of a deformable cartridge shell or like article which comprises deforming the article by pressure at a pre-established point to a deformation dimension pre-established from an article having acceptable anneal boundaries, releasing the deformation pressure to permit elastic recovery, and gauging the elastic recovery dimension at a pre-established point other than said first mentioned pre-established point in comparison with an elastic recovery dimension pre-established from said article having acceptable anneal boundaries.

3. The method of testing the potential elastic recovery of the metal of a cartridge shell from internal firing pressure and anneal of the neck, which comprises squeezing the shell transversely at a pre-established point by external pressure to a pre-established deformation dimension, releasing the external squeezing pressure to permit elastic recovery, and gauging the elastic recovery dimension at a pre-established point other than said first mentioned pre-established point in comparison with a pre-established elastic recovery dimension of an acceptable cartridge shell.

4. The method of testing the anneal of the metal of deformable cartridge shells or like articles which comprises locating the articles in the same fixed position; deforming the articles by pressing to a deformation dimension pre-established as to location and amount from an article of acceptable anneal; releasing the deformation pressure to permit elastic recovery; and gauging the elastic recovery dimension in comparison with an elastic recovery dimension pre-established from said article of acceptable anneal.

5. The method of testing the zone and degree of anneal of a cartridge case which comprises locating the base of the case in a fixed position; deforming the article by pressing at a fixed predetermined distance from the base, said case being pressed to a deformation dimension pre-established from a case of acceptable anneal; releasing the deformation pressure to permit elastic recovery; and gauging the elastic recovery dimension at a fixed point other than said aforementioned predetermined distance from the base relative to the length of the case in comparison with an elastic recovery dimension pre-established from a case of acceptable anneal.

6. A testing device for testing the potential elastic recovery of the metal of a cartridge shell having a base, body and neck comprising a locating abutment for the base of the cartridge shell; an anvil base member located near the neck of the shell and a relatively movable cooperating opposed pressure member adapted to receive the article to be squeezed thereby at a fixed location relative to the length of the article; means to operate said pressure member to keep the same substantially parallel to said anvil base member; stop means to limit the squeezing movement of said pressure member toward said base member to a pre-established squeeze dimension; and a pressure applying lever engaged with said pressure member.

7. The method of testing the zone and degree of anneal of the shoulder of a cartridge shell having a mouth, shoulder, and body portion which comprises squeezing the shell transversely to a pre-established deformation dimension at a point other than the shoulder, releasing external squeezing pressure to permit elastic recovery and gauging the elastic recovery dimension at a pre-established point other than the first mentioned pre-established point in comparison with a pre-established elastic recovery dimension of an acceptacle cartridge shell.

JOHN P. CATLIN.
GEORGE R. ECKSTEIN.